A. C. Mason.
Churn.
N°. 56,771. Patented Jan. 31, 1866.
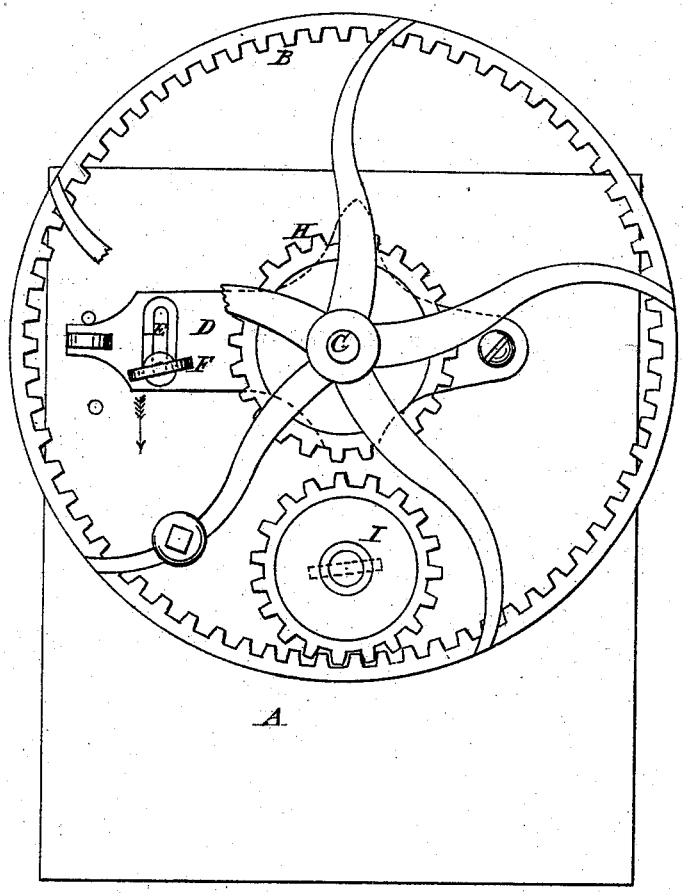
WITNESSES:
INVENTOR:

UNITED STATES PATENT OFFICE.

ALVIN C. MASON, OF SPRINGFIELD, VERMONT.

IMPROVEMENT IN GEARINGS FOR CHURNS.

Specification forming part of Letters Patent No. 56,771, dated July 31, 1866.

*To all whom it may concern:*

Be it known that I, A. C. MASON, of Springfield, in the county of Windsor and State of Vermont, have invented a new and Improved Gearing for Churns; and I do hereby declare that the following is a full, clear, and exact description thereof, which will enable those skilled in the art to make and use the same, reference being had to the accompanying drawing, forming part of this specification.

The nature of my invention consists in providing gear-wheels and attaching them to the beaters of a churn, so that the motion of the beaters may be changed to a slower motion as the cream thickens, and the power is equalized to the increased resistance as the cream becomes thick, or while the butter is separating from the milk, and at which time the beaters require a slower motion.

The figure represents a top-plan view of my improved gear for churns.

A represents the lid or top of a churn, to which I attach my improved gear. B is a large spur or driving wheel, which runs upon a suitable shaft, C. The said shaft C runs upon a journal in proper bearings secured rigidly to a movable plate, D, in one end of which is a slot, E, which runs transversely with the said plate D, and through which the thumb-screw F passes. The end of the plate opposite from the slot is secured by a screw-bolt, G, and upon which it is allowed to turn.

Upon the arms of the wheel B is secured the lesser driving-wheel H, which is provided for the purpose of giving a slower motion to the beaters than by the larger wheel B. I is a pinion, which is firmly secured to the shaft to which the beaters are attached.

The operation consists in putting the pinion I into mesh with the teeth upon the inside of the rim of the wheel B, which, when the wheel B is put in motion, imparts a rapid motion to the pinion I, which turns the shaft upon which the beaters are attached. When the butter begins to separate, of course the resistance becomes much greater upon the beaters, and for a successful and economical operation they require a slower motion. To produce this the thumb-screw F is loosened, and the plate D is thrown forward in the direction of the arrow, which engages the wheel H with the pinion I, and at the same time disengages the pinion from the teeth upon the inside of the rim of the wheel B, so that the power to overcome the resistance is increased in proportion as the size of the wheel H bears to the wheel B.

Thus it will be seen that by my invention the power is increased equal to that of the resistance as the cream thickens and as the butter separates, and at the same time the proper motion is imparted to the beaters, so as to make the operation of churning easy and economical.

Having thus described my invention, what I claim as new, and desire to secure by Letters Patent, is—

1. The gear-wheels B and H, in combination with the pinion I, so that the motion of the beaters may be reduced or accelerated, for the purposes and substantially as described.

2. The plate D, or its equivalent, in combination with the wheels B and H and pinion I, substantially as herein set forth.

ALVIN C. MASON.

Witnesses:
WM. F. MCNAMARA,
ALEX. F. ROBERTS.